(12) United States Patent
O'Sullivan et al.

(10) Patent No.: US 8,788,309 B2
(45) Date of Patent: Jul. 22, 2014

(54) APPLICATION OF COST CONSTRAINTS IN EVENT SCHEDULING

(75) Inventors: Patrick Joseph O'Sullivan, Ballsbridge (IE); Carol Sue Zimmet, Boxborough, MA (US); Al Chakra, Apex, NC (US); Colm Farrell, Clonsilla (IE); Liam Harpur, Skerries (IE)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 12/256,839

(22) Filed: Oct. 23, 2008

(65) Prior Publication Data

US 2010/0106627 A1 Apr. 29, 2010

(51) Int. Cl.
*G06Q 10/00* (2012.01)
*G06Q 10/06* (2012.01)
*G06Q 10/10* (2012.01)

(52) U.S. Cl.
CPC .. *G06Q 10/063116* (2013.01); *G06Q 10/06311* (2013.01); *G06Q 10/0631* (2013.01); *G06Q 10/06* (2013.01); *G06Q 10/06315* (2013.01); *G06Q 10/10* (2013.01); *G06Q 10/1093* (2013.01); *G06Q 10/109* (2013.01); *G06Q 10/1091* (2013.01); *G06Q 10/1095* (2013.01); *G06Q 10/06312* (2013.01); *G06Q 10/06314* (2013.01); *G06Q 10/06375* (2013.01)
USPC ....... 705/7.16; 705/7.13; 705/7.18; 705/7.24; 705/7.22; 705/7.12

(58) Field of Classification Search
CPC . G06Q 10/047; G06Q 10/0631; G06Q 10/06; G06Q 10/087; G06Q 10/06315; G06Q 10/10; G06Q 10/06311; G06Q 10/06316; G06Q 10/063116; G06Q 10/06312; G06Q 10/1097; G06Q 10/1093; G06Q 10/109; G06Q 10/1095; G06Q 10/06314; G06Q 10/0635; G06Q 40/08; G06Q 10/06375; G06Q 30/02; G06Q 40/10; G06Q 40/02; G06Q 40/00; G06Q 30/04; G06Q 20/10
USPC ............... 705/6, 8, 26, 7.18, 7.12, 7.13, 7.16, 705/7.22, 30, 7.24
See application file for complete search history.

(56) References Cited

U.S. PATENT DOCUMENTS 4,445,181 A * 4/1984 Yatman ......................... 705/418
4,977,520 A 12/1990 McGaughey, III et al.
(Continued)

OTHER PUBLICATIONS

Archived version of AllMeetings-com, retrieved from Atchives-org, 2000.*

(Continued)

*Primary Examiner* — Justin M Pats
*Assistant Examiner* — Octavian Rotaru
(74) *Attorney, Agent, or Firm* — Holland & Knight LLP; Brian J. Colandreo, Esq.; Jeffrey T. Placker, Esq.

(57) ABSTRACT

A cost metric is associated with each of a plurality of calendar event parameters of a proposed calendar event. A calendar event cost projection is determined based upon, at least in part, the cost metric associated with each of the plurality of the calendar event parameters. The calendar event cost projection is compared to a calendar event budget. At least one of the plurality of calendar event parameters is selected based upon, at least in part, the comparison of the calendar event cost projection to the calendar event budget.

11 Claims, 4 Drawing Sheets

(56) References Cited

U.S. PATENT DOCUMENTS

| | | | | |
|---|---|---|---|---|
| 5,050,077 | A | * | 9/1991 | Vincent .................... 705/7.19 |
| 5,615,121 | A | * | 3/1997 | Babayev et al. ............ 705/7.22 |
| 5,832,453 | A | * | 11/1998 | O'Brien ........................ 705/6 |
| 5,890,134 | A | * | 3/1999 | Fox ............................ 705/7.24 |
| 6,085,166 | A | * | 7/2000 | Beckhardt et al. .......... 705/7.18 |
| 6,085,205 | A | | 7/2000 | Peairs et al. |
| 6,101,480 | A | * | 8/2000 | Conmy et al. ............... 705/7.18 |
| 6,220,512 | B1 | * | 4/2001 | Cooper ...................... 235/382 |
| 6,324,517 | B1 | * | 11/2001 | Bingham et al. ............ 705/7.24 |
| 6,564,240 | B2 | | 5/2003 | Waldo et al. |
| 6,587,877 | B1 | * | 7/2003 | Douglis et al. ............... 709/224 |
| 6,604,127 | B2 | | 8/2003 | Murphy et al. |
| 6,654,793 | B1 | | 11/2003 | Wollrath et al. |
| 6,684,213 | B1 | | 1/2004 | Schell et al. |
| 6,704,756 | B2 | | 3/2004 | Wollrath et al. |
| 6,714,967 | B1 | | 3/2004 | Horvitz |
| 6,728,737 | B2 | | 4/2004 | Wollrath et al. |
| 6,732,103 | B1 | * | 5/2004 | Strick et al. ............. 707/999.01 |
| 6,816,875 | B2 | | 11/2004 | Wollrath et al. |
| 6,826,543 | B1 | * | 11/2004 | Harford et al. .................. 705/37 |
| 6,832,223 | B1 | | 12/2004 | Scheifler et al. |
| 6,901,518 | B1 | | 5/2005 | Scheifler et al. |
| 6,925,644 | B2 | | 8/2005 | Waldo et al. |
| 6,938,263 | B2 | | 8/2005 | Wollrath et al. |
| 7,058,954 | B1 | | 6/2006 | Wollrath et al. |
| 7,069,097 | B1 | * | 6/2006 | Barto et al. ................. 700/100 |
| 7,181,427 | B1 | | 2/2007 | DeFrancesco et al. |
| 7,283,971 | B1 | * | 10/2007 | Levine et al. ............... 705/7.13 |
| 7,343,312 | B2 | * | 3/2008 | Capek et al. ..................... 705/8 |
| 7,881,232 | B2 | * | 2/2011 | Bieselin et al. ............... 370/260 |
| 7,991,637 | B1 | * | 8/2011 | Guiheneuf et al. .......... 705/7.18 |
| 8,027,949 | B2 | * | 9/2011 | Kiernan et al. ............ 706/58 |
| 2002/0016729 | A1 | * | 2/2002 | Breitenbach et al. ............ 705/9 |
| 2002/0032592 | A1 | * | 3/2002 | Krasnick et al. ................... 705/8 |
| 2002/0065689 | A1 | * | 5/2002 | Bingham et al. .................. 705/5 |
| 2002/0184063 | A1 | * | 12/2002 | Kaufman et al. .................. 705/7 |
| 2004/0186763 | A1 | * | 9/2004 | Smith ............................... 705/9 |
| 2004/0210513 | A1 | * | 10/2004 | Harford et al. ................... 705/37 |
| 2005/0033615 | A1 | * | 2/2005 | Nguyen et al. .................... 705/5 |
| 2006/0004613 | A1 | * | 1/2006 | Roller et al. ...................... 705/6 |
| 2006/0010023 | A1 | * | 1/2006 | Tromczynski et al. .......... 705/8 |
| 2006/0045253 | A1 | * | 3/2006 | Bieselin et al. .......... 379/202.01 |
| 2006/0143063 | A1 | * | 6/2006 | Braun et al. ...................... 705/8 |
| 2006/0271419 | A1 | * | 11/2006 | O'Sullivan ........................ 705/8 |
| 2007/0118415 | A1 | * | 5/2007 | Chen et al. ........................ 705/8 |
| 2007/0192199 | A1 | * | 8/2007 | Simpson et al. ................ 705/26 |
| 2007/0282661 | A1 | * | 12/2007 | Franco ............................. 705/9 |
| 2008/0046298 | A1 | * | 2/2008 | Ben-Yehuda et al. ............ 705/6 |
| 2008/0059256 | A1 | * | 3/2008 | Lynch ............................... 705/7 |
| 2008/0114716 | A1 | * | 5/2008 | Mock ............................... 707/1 |
| 2008/0133282 | A1 | * | 6/2008 | Landar et al. ..................... 705/5 |
| 2008/0189734 | A1 | * | 8/2008 | Schepers et al. ............... 725/32 |
| 2009/0063245 | A1 | * | 3/2009 | Anderson ......................... 705/9 |
| 2009/0106077 | A1 | * | 4/2009 | Bhogal et al. .................... 705/9 |
| 2009/0177503 | A1 | * | 7/2009 | Kawano et al. ................... 705/5 |
| 2009/0192702 | A1 | * | 7/2009 | Bourne ......................... 701/200 |
| 2009/0216595 | A1 | * | 8/2009 | Coulomb et al. ................. 705/8 |
| 2009/0276278 | A1 | * | 11/2009 | Machtelinck ..................... 705/9 |
| 2009/0327019 | A1 | * | 12/2009 | Addae et al. ...................... 705/9 |
| 2010/0017371 | A1 | * | 1/2010 | Whalin et al. .................... 707/3 |
| 2010/0106627 | A1 | * | 4/2010 | O'Sullivan et al. ............. 705/30 |
| 2010/0138246 | A1 | * | 6/2010 | Carey et al. ....................... 705/5 |
| 2011/0099138 | A1 | * | 4/2011 | Van Hentenryck et al. .... 706/46 |

OTHER PUBLICATIONS b-there-com and AllMeetings-com Partnership Revolutionizes Planning Process , retrieved from ProQuest, PR Newswire May 4, 2000.*
Doss et al, Calendar Awarness Services, IBM Technical Report 29-3617, 2003.*
Milum Corporation, Office Tracker version 6-5, user manual, 2004.*
Bartschi, Matthew Wall, A Genetic Algorithm for Resource-Constrained Scheduling, MIT, Jun. 1996.*
Kerzner, Harlod, Project Management a System Approch to Planning, Scheduling and Controlling, 8th edition, 2003, John Wiley & Sons Inc. (pp. 635-641).*
Sriprasert, Eknarin and Dawood, Nashwan, Genetic Algorithms for Multi-Constraint Scheduling: An Application for the Construction Industry Centre for Construction Innovation Research Construction Information Digital Library, 2003.*
Ball, Corbin, Meeting Planning Software—Making Your Job, Easier 1999, Corbin Ball Associates, Retrieved Mar. 7, 2005 from www.corbinball.com/articles.*
Burke et al, A Multistage Evolutionary Algorithm for the Timetable Proble, IEEE Transactions on Evolutionary Computation, V3, N1, Apr. 1999 http://ieeexplore.ieee.org/stamp/stamp.jsp?tp=&arnumber=752921.*
Dinkel et al, An Efficient Decision Support System for Academic Course Scheduling, Operations Research, V37, N6, pp. 853-864, Dec. 1989.*
Montana et al, Genetic Alghorithms for Complex, Real-Time Scheduling, IEEE, 0-7803-4778-1, 1998 http://ieeexplore.ieee.org/xpls/abs_all.jsp?arnumber=724984&tag=1.*
Abernathy et al, A Three-Stage Manpower Planning and Scheduling Model—A Service-Sector Example, Operations Research, V21, N3, pp. 693-711, 1973 http://www.jstor.org/stable/pdfplus/169379.pdf?acceptTC=true.*
Wang Yuan, How to use Genetic Alghorithm for Traveling Salesman Problem, Visual C, c-sharpcorner, Dec. 20th, 2006 http://www.c-sharpcorner.com/UploadFile/yuanwang200409/GeneticAlgorithm12182006201710PM/GeneticAlgorithm.aspx.*
Dinkel et al, An Efficient Decision Support System for Academic Course Scheduling, Operations Research, V37, N6, pp. 853-864, Dec. 1989 http://www.jstor.org/stable/pdfplus/171469.pdf.*
Constant, Cherisse, Planning made easy Successful Meetings, Jun. 1999, vol. 48, No. 7, pp. 47-57.*
Kadlec, Cynthia et al., SM's Ultimate Guide Web Sites with Planner Power, Successful Meetings, Jun. 2000, vol. 49, No. 7, pp. 49-66.*
StarCite Announces Key Management team Additions to Drive Its B2B E-Commerce Meeting Marketplace Website Business Wire, Nov. 3, 1999.*
StarCite.com—News/Events—Press Release Archive 1999-2001 Retrieved Mar. 7, 2005 from www.starcite.com/pages/newsevents/newsevts_archive.htm.*
Event 411.com and EventSource.com Partner to Streamline and Manage Corporate Meeting Planning Business Wire, Apr. 4, 2000.*
DNCC Names Event 411.com the Official Event-Planning Provider of the 2000 Democratic Convention in Los Angeles, Business Wire, Feb. 17, 2000.*
Event 411.com WebPages—Home Who We Are, What We Do, and Product Pages, www.event411.com, Jan. 12, 2000.*
Krause, Carla, Paperless Meeting Management Draws Closer to Reality, PCMA.org, Convene Archives, Sep. 1999, Retrieved Mar. 7, 2005 from www.pcma.org/resources/convene/archives.*
Fox, Doug, PlanSoft: Is it the Real Thing? PCMA.org, Convene Archives, Jun. 1999, Retrieved Mar. 7, 2005 from www.pcma.org/resources/convene/archives.*
EventSource.com—About and Bookit! web pages 1999, Retrieved from Archives.org Mar. 7, 2005.*
Reardon, Marguerite, Event Planner Offers Custom Sites Information Week, Dec. 6, 1999 p. 44.*
Planning and managing meetings, Business Travel News, ProQuest, Apr. 10, 2000.*
Weaver Patrick, A brief history of scheduling, mosaic project services ltd, Apr. 2006.*

* cited by examiner

APPLICATION OF COST CONSTRAINTS IN EVENT SCHEDULING

BACKGROUND OF THE INVENTION

This disclosure relates to event scheduling, and more particularly to applying cost constraints in event scheduling.

In the present internet and electronic communication age, electronic scheduling is an increasingly prevalent means of coordinating meetings, especially because it allows the same event scheduling message to be easily sent to a large group of people. Additionally, the ease of teleconferencing, webconferencing and videoconferencing has made it possible for users around the world to participate in events such as meetings for which attendance would otherwise have involved travel. Typically, considerations such as who should attend a scheduled event, when and where the event takes place, and the form of the event are up to the discretion of the individual scheduling the event. As such, decisions may be made which disregard cost and convenience of the participants.

BRIEF SUMMARY OF THE INVENTION

In a first implementation, a method of applying cost constraints in event scheduling includes determining a cost metric associated with each of a plurality of calendar event parameters of a proposed calendar event. A calendar event cost projection is determined based upon, at least in part, the cost metric associated with each of the plurality of the calendar event parameters. The calendar event cost projection is compared to a calendar event budget. At least one of the plurality of calendar event parameters is selected based upon, at least in part, the comparison of the calendar event cost projection to the calendar event budget.

According to another implementation, a computer program product resides on a computer readable medium having a plurality of instructions stored on it. When executed by a processor, the instructions cause the processor to perform operations including determining a cost metric associated with each of a plurality of calendar event parameters of a proposed calendar event. A calendar event cost projection is determined based upon, at least in part, the cost metric associated with each of the plurality of the calendar event parameters. The calendar event cost projection is compared to a calendar event budget. At least one of the plurality of calendar event parameters is selected based upon, at least in part, the comparison of the calendar event cost projection to the calendar event budget.

In another implementation, a computing system includes at least one processor and at least one memory architecture coupled with the at least one processor. A first software module is executed on the at least one processor and the at least one memory architecture. The first software module is configured to determine a cost metric associated with each of a plurality of calendar event parameters of a proposed calendar event. A second software module is executed on the at least one processor and the at least one memory architecture. The second software module is configured to determine a calendar event cost projection based upon, at least in part, the cost metric associated with each of the plurality of the calendar event parameters. A third software module is executed on the at least one processor and the at least one memory architecture. The third software module is configured to compare the calendar event cost projection to a calendar event budget. A fourth software module is executed on the at least one processor and the at least one memory architecture. The fourth software module is configured to select at least one of the plurality of calendar event parameters based upon, at least in part, the comparison of the calendar event cost projection to the calendar event budget.

The details of one or more implementations are set forth in the accompanying drawings and the description below. Other features will become apparent from the description, the drawings, and the claims.

BRIEF DESCRIPTION OF THE SEVERAL VIEWS OF THE DRAWINGS

Like reference symbols in the various drawings denote like elements.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
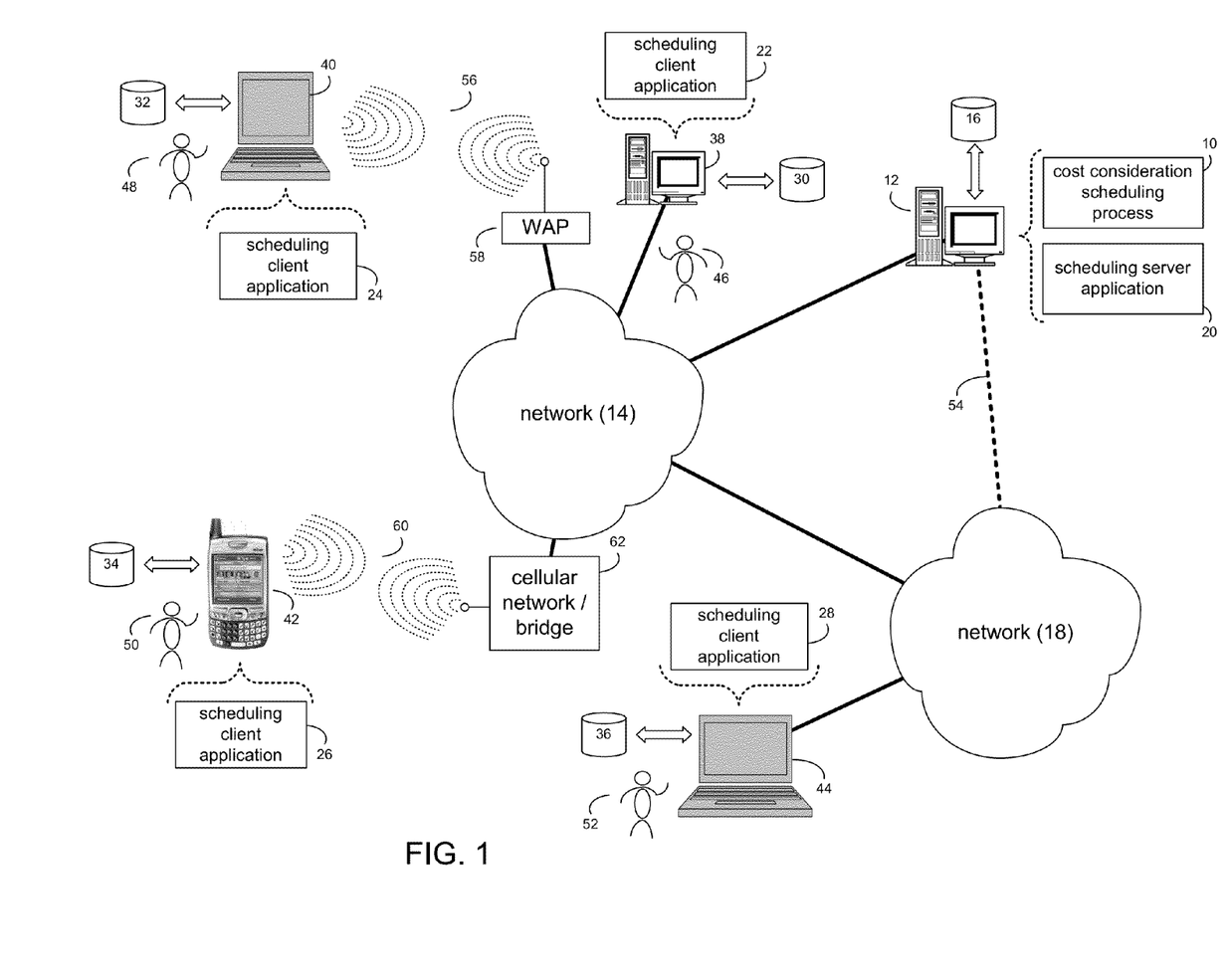
FIG. 1 diagrammatically depicts a cost consideration scheduling process coupled to a distributed computing network.

Referring to FIG. 1, cost consideration scheduling process 10 may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both). Alternatively, the cost consideration scheduling process may reside on, and be executed by, a client electronic device, such as a personal computer, notebook computer, personal digital assistant, or the like.

As will be discussed below in greater detail, the cost consideration process may generally allow for applying cost constraints in event scheduling and providing feedback to the event scheduler, allowing options effecting the cost of the event to be selected. As such, cost consideration scheduling process 10 may determine a cost metric associated with each of a plurality of calendar event parameters of a proposed calendar event. A calendar event cost projection may be determined based upon, at least in part, the cost metric associated with each of the plurality of the calendar event parameters. The calendar event cost projection may be compared to a calendar event budget. At least one of the plurality of calendar event parameters may be selected based upon, at least in part, the comparison of the calendar event cost projection to the calendar event budget.

The instruction sets and subroutines of cost consideration scheduling process 10, which may be configured as one or more software modules, and which may be stored on storage device 16 coupled to server computer 12, may be executed by one or more processors (not shown) and one or more memory architectures (not shown) incorporated into server computer 12. Storage device 16 may include but is not limited to: a hard disk drive; a solid state drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute one or more scheduling server applications (e.g., scheduling server application 20), examples of which may include but are not limited to, e.g., Lotus® Domino® Server and Microsoft Exchange Server® (Lotus and Domino are registered trademarks of International Business Machines Corporation in the United States, other countries, or both; and Exchange Server is a registered trademark of Microsoft Corporation in the United States, other countries, or both). Scheduling server application 20 may interact with one or more scheduling client applications (e.g., scheduling client applications 22, 24, 26, 28) for routing and managing scheduling communications. Examples of scheduling client applications 22, 24, 26, 28 may include, but are not limited to, e.g., Lotus Notes® and Microsoft Outlook® (Lotus Notes is a registered trademark of International Business Machines Corporation in the United States, other countries, or both; and Outlook is a registered trademark of Microsoft Corporation in the United States, other countries, or both). Cost consideration scheduling process 10 may be a stand-alone application that interfaces with scheduling server application 20 or may be an applet/application that is executed within scheduling server application 20.

The instruction sets and subroutines of scheduling server application 20, which may be configured as one or more software modules, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the cost consideration scheduling process may be a client-side application (not shown) residing on one or more client electronic devices 38, 40, 42, 44 (e.g., stored on storage devices 30, 32, 34, 36, respectively). As such, the cost consideration scheduling process may be a stand-alone application that interfaces with a scheduling client application (e.g., scheduling client applications 22, 24, 26, 28), or may be an applet/application that is executed within a scheduling client application. As such, the cost consideration scheduling process may be a client-side process, a server-side process, or a hybrid client-side/server-side process, which may be executed, in whole or in part, by server computer 12, or one or more of client electronic devices 38, 40, 42, 44.

The instruction sets and subroutines of scheduling client applications 22, 24, 26, 28, which may be configured as one or more software modules, and which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using scheduling client applications 22, 24, 26, 28, users 46, 48, 50, 52 may send, receive, manage, etc., scheduling communications. Sending, receiving, and managing scheduling communications may include accessing and/or interacting with scheduling server application 20.

Users 46, 48, 50, 52 may access scheduling server application 20 directly through the device on which the scheduling client application (e.g., scheduling client applications 22, 24, 26, 28) is executed, namely client electronic devices 38, 40, 42, 44, for example. Users 46, 48, 50, 52 may access scheduling server application 20 directly through network 14 or through secondary network 18. Further, server computer 12 (i.e., the computer that executes scheduling server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection. Various additional and/or alternative wired and wireless connections may similarly be employed between the various client electronic devices and networks 14, 18, such as infrared connectivity.

Client electronic devices 38, 40, 42, 44 may each execute an operating system, examples of which may include but are not limited to Microsoft Windows, Microsoft Windows CE®, Red Hat Linux, or a custom operating system (Windows CE is a registered trademark of Microsoft Corporation in the United States, other countries, or both).

Figure 2:
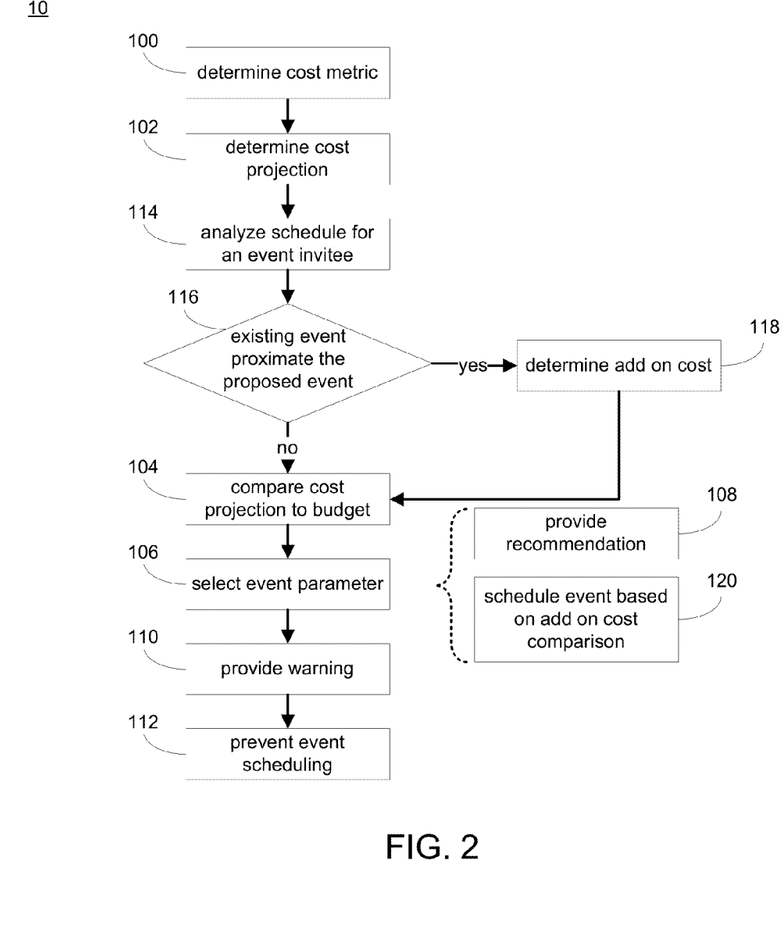
FIG. 2 is a flowchart of a process executed by the cost consideration scheduling process of FIG. 1.

Referring also to FIG. 2, cost consideration scheduling process 10 may determine 100 a cost metric associated with each of a plurality of calendar event parameters of a proposed calendar event. Cost consideration scheduling process 10 may further determine 102 a calendar event cost projection based upon, at least in part, the cost metric associated with each of the plurality of the calendar event parameters. The calendar event cost projection may be compared 104 to a calendar event budget. Cost consideration scheduling process 10 may select 106 at least one of the plurality of calendar event parameters based upon, at least in part, the comparison 104 of the calendar event cost projection to the calendar event budget.

Figure 3:
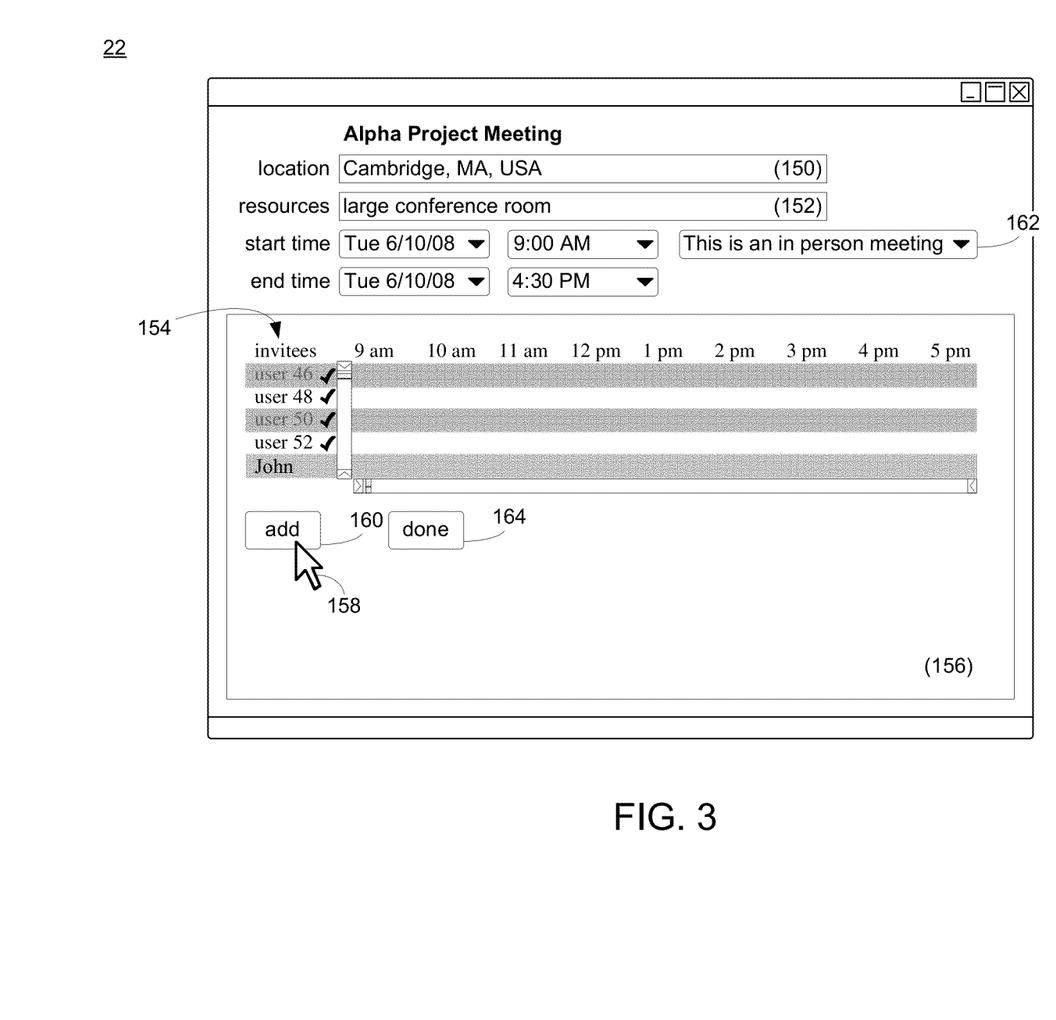
FIG. 3 diagrammatically depicts a display screen rendered, at least in part, by the cost consideration scheduling process of FIG. 1.

For example, and referring also to FIG. 3, a user (e.g., user 46) may schedule a proposed calendar event (e.g., Alpha Project Meeting) using scheduling client application 22. While an exemplary user interface is depicted herein, such a user interface should not be construed as a limitation on the present disclosure, as the nature of the user interface may vary depending upon the scheduling client application utilized, user need, and design criteria. User 46 may designate a location (e.g., Cambridge, Mass., USA, in location field 150), and any particular resources required for the meeting (e.g., large conference room, in resources field 152). For example, user 46 may input, via a keyboard (not shown) the intended location of the meeting and any resources required for the meeting. Additionally, user 46 may define (e.g., in invitee field 154) at least one invitee (e.g., users 46, 48, 50, 52 and John) in invitee pane 156. For example, user 46 may input, via the keyboard, one or more of the invitees. Additionally/alternatively, user 46 may select, via onscreen pointer 158 (e.g., which may be controlled by a pointing device, such as a mouse; not shown) add button 160, which may result in scheduling client application 22 rendering a contacts list (not shown) from which user 46 may select one or more of the desired invitees. Additionally, user 46 may indicate (e.g., via associated checkmarks in invitee field 154) that user 46, user 48, user 50, and user 52 are required invitees, while John is a desired invitee. Additionally, user 46 may select, via onscreen pointer 158 and pull-down menu 162, that the meeting is an in person meeting (e.g., as opposed to a teleconference, web-conference, or the like).

Once user 46 has input required information for the proposed calendar event (i.e., the meeting), user 46 may select (e.g., via onscreen pointer 158) done button 164. In response to user 46 selecting done button 164, cost consideration scheduling process 10 may determine 100 a cost metric associated with each of a plurality of calendar event parameters of a proposed calendar event (e.g., the Alpha Project Meeting). The calendar event parameters may include any aspects associated with the calendar event having a directly, or indirectly, associated cost (e.g., a monetary cost, a subjective value cost, a lost opportunity cost, or the like). For example, the calendar event parameters may include the identity and number of meeting invitees (e.g., user 46, user 48, user 50, user 52, and John), the location of the one or more invitees (e.g., which may give rise to lost time for traveling to, and attending the calendar event), the location of the event (e.g., Cambridge, Mass., USA), travel required for each invitee to attend in person, the proposed time of the event (e.g., 9:00 AM through 4:30 PM on Tuesday, Jun. 10, 2008) and the type of event (e.g., an in person meeting). While the event may be a live, in person event (e.g., which may require each of the invitees to be physically present in a common location), the event may alternatively be one that can be attended remotely, such as a teleconference, a videoconference or a webconference (e.g., which would not require each of the invitees to be physically present in a common location). The invitees may be any range in a hierarchy of employees, such as executives or administrative staff (e.g., whose time by be valued differently by a company, or other organization).

As generally mentioned above, various calendar event parameters may have an associated cost, e.g., which may be indicated by a cost metric. The cost metric may be at least one of an attendance cost per invitee (e.g., in terms of a direct monetary cost associated with attendance, a lost opportunity cost resulting from an invitees unavailability for other tasks, or the like), a travel cost per invitee, an event time cost, an event location cost and an event type cost. Attendance cost per invitee may vary for each individual depending upon each individual's ranking in an organizational hierarchy, the individual's experience, or the like. For example, a company may value (either subjectively or objectively) a senior executive's time more highly than it values a junior architects time. As such, the cost of the senior executive attending the calendar event may be greater than the cost of the junior architect attending the calendar event.

Similarly, the attendance cost per invitee may vary for each individual depending upon each invitee's location and whether the invitee would have to work after hours to participate in the event. For example, a teleconference may be scheduled for 4 pm Eastern Standard Time. An invitee residing in Ireland may be required to be available outside of normal working hours to participate in the teleconference as a result of the time difference. As such, the attendance cost (e.g., in terms of subjective cost, monetary cost associated with overtime, or the like) of the invitee in Ireland may be greater than the attendance cost for an invitee residing on the east coast of the United States, who may participate in the teleconference during normal business hours. Similarly, the attendance cost per invitee may vary depending upon the day of the week of the calendar event. For example, the cost of attendance for an invitee may be greater if attendance at the calendar event, or travel to or from the calendar event, is required on a weekend, holiday, or other non-standard (for the invitee) work time.

The travel cost per invitee may depend upon whether the event is a live event or an event that can be attended remotely. For example, a teleconference, webconference, or the like may be remotely attended by an invitee without incurring travel costs. However, an in person calendar event may require remote invitees to travel to a common location. As such, the calendar event may incur travel and lodging expenses associated for remote invitees.

The event location cost may vary depending upon whether a venue, such as a conference room, is needed or whether audio-visual equipment is needed. For example, a conference room in a third party facility (such as a hotel, conference center, or the like) may incur a direct monetary cost associated with the calendar event. While a conference room owned, e.g., by the host of the calendar event, may not incur a direct monetary cost, an opportunity cost may be incurred, in that another event or meeting cannot take place in the conference room during the calendar event.

As mentioned above, the cost metric associated with the calendar event may include an attendance cost per invitee. Continuing with the above-stated example, assume that user 46 is a junior architect; user 48, user 50, and user 52 are senior architects; and John is a senior executive. As such, a relatively high attendance cost may be associated with John as a senior executive, e.g., who may be responsible for many important matters that cannot be attended to while attending the Alpha Project Meeting. Similarly, a relatively lower attendance cost may be associated with user 48, user 50, and user 52, as compared to John. Finally, a still lower relative attendance cost may be associated with user 46, as a junior architect.

Additionally, the cost metric associated with the calendar event may include a travel cost per invitee. Still continuing with the above-stated example, further, assume that user 46 may be geographically located in Boston, Mass., while user 48, user 50 and John may be geographically located in Raleigh, N.C., and user 52 may be geographically located in Dublin, Ireland. As user 46 is geographically located proximate to the meeting site (e.g., Cambridge), there may be a relatively low travel cost associated with user 46. Conversely, as user 52 is geographically located in Ireland, there may be a relatively high travel cost associated with user 52. While the travel cost associated with each of user 48, user 50 and John may be individually less than the travel cost associated with user 52, the aggregate travel cost associated with user 48, user 50 and John may be greater than the travel cost associated with user 52. However, as user 48, user 50 and John may travel from a common location, the aggregate travel cost for user 48, user 50, and John may be greater than the travel cost associated with user 52. The respective travel costs may be determined, e.g., from a third party travel agency (e.g., Expedia.com) as a web service.

Cost consideration scheduling process 10 may further determine 102 a calendar event cost projection based upon, at least in part, the cost metric associated with each of the plurality of calendar event parameters. For example, the cost projection for the Alpha Project Meeting may be the sum of the determined 100 cost metrics associated with each of the plurality of calendar event parameters. The cost projection may be provided as a monetary value, e.g., by utilizing an actual cost of parameters having a defined cost, and by applying a dollar value to subjective parameters (e.g., the cost associated with a senior invitee relative to the cost associated with a junior invitee). Additionally/alternatively, a relative value may be applied to each of the cost metrics (e.g., including subjective parameters, such as lost opportunity associated with utilizing a conference room for the meeting). Various values associated with calendar event parameters may be stored, e.g., in a database accessible by cost consideration scheduling process 10.

Cost consideration scheduling process 10 may further compare 104 the calendar event cost projection to a calendar event budget. The calendar event budget may be, for example, a dollar value calendar event budget, it may be a portion of and annual calendar event budget (e.g., allocated for a specific department or the like). Additionally/alternatively, the calendar event budget may be a relative budget. A relative budget may include a calendar event budget that is a percentage of a minimum budget. The minimum budget may include the lowest cost achievable while still allowing a meeting including the necessary invitees.

Additionally, cost consideration scheduling process 10 may select 106 at least one of the plurality of calendar event parameters based upon, at least in part, the comparison of the calendar event cost projection to the calendar event budget. For example, selecting 106 at least one of the calendar event parameters may include providing 108 a recommendation for at least one of the plurality of calendar event parameters based upon, at least in part, the comparison of the calendar event cost projection to the calendar event budget. For example, and referring also to FIG. 4, cost consideration scheduling process 10 (alone or in conjunction with one or more of scheduling server application 20 and scheduling client application 22) render selection menu 164, which may include one or more recommendations to reduce the calendar event cost projection. While selection menu 200 is shown including four options (namely "remove John", "remove user 52", "move location to Raleigh", and "conduct teleconference"), this should not be construed as a limitation of the present disclosure, as the number and nature of the options included within selection menu 164 may vary based upon the calendar event parameters, user need, and design criteria.

Figure 4:
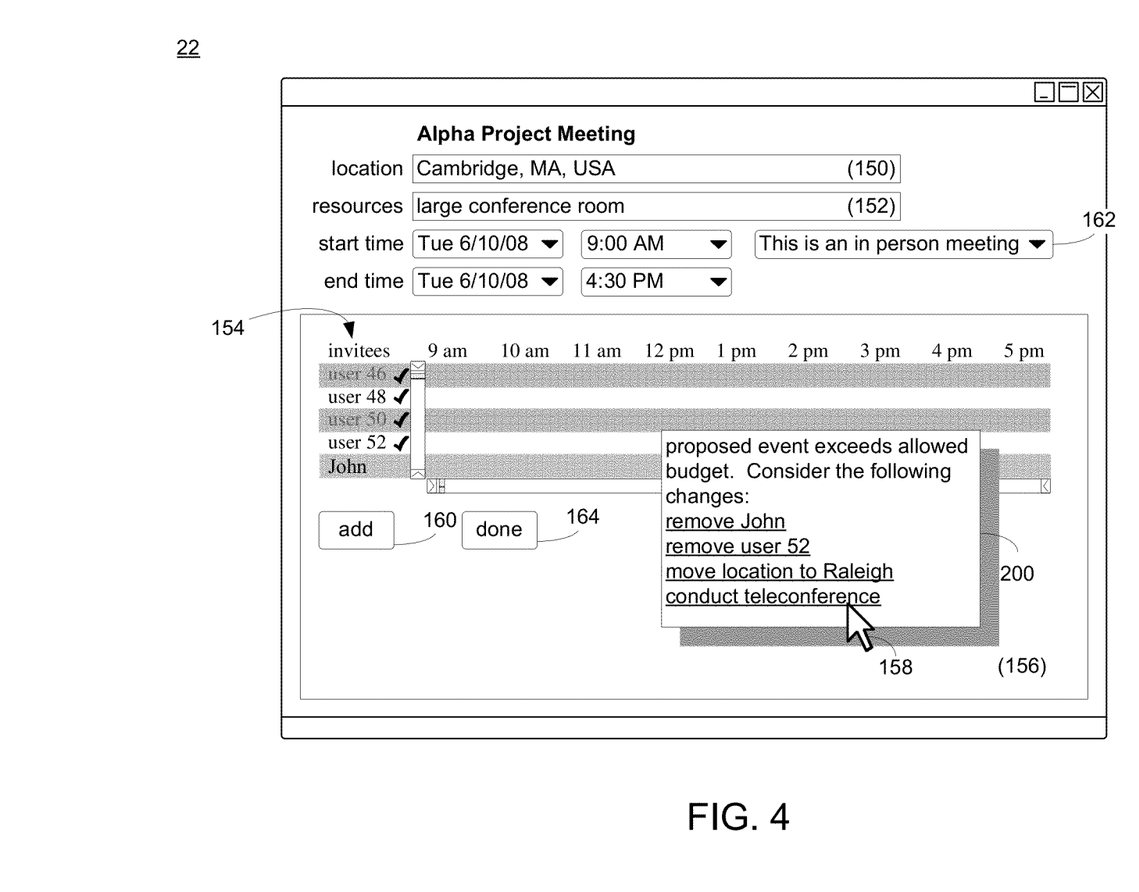
FIG. 4 diagrammatically depicts a display screen rendered, at least in part, by the cost consideration scheduling process of FIG. 1.

User 46 may select one or more options from within selection menu 200, thereby reducing the calendar event cost projection. For example, as a senior executive, John may have an invitee cost. Similarly, as John is not an essential invitee (e.g., as indicated by the lack of a checkmark in invitee field 156), John may be removed from the meeting (while still allowing the meeting to be conducted) thereby eliminating the travel cost associated with John attending the meeting. In a similar manner, as user 52 (e.g., who may be geographically located in Ireland) may have the highest associated travel cost, eliminating user 52 from the meeting (e.g., which may include allowing remote participation via teleconferencing, videoconferencing, or the like) may reduce the cost projection of the calendar event. Further, as the majority of the meeting invitees (e.g., user 48, user 50, and John) are geographically located in Raleigh, moving the location of the meeting to Raleigh may reduce the overall travel cost associated with the meeting (e.g., by only requiring user 46 and user 52 to travel to Raleigh), thereby reducing the cost projection associated with the calendar event.

Additionally, cost consideration scheduling process 10 may provide 110 a warning if a selection of at least one of the plurality of calendar event parameters results in a calendar event cost projection exceeds the calendar event budget. For example, selection menu 164 may include the warning "proposed event exceeds allowed event budget." Additionally, preferences may be set (e.g., by an administrator or the like), whereby cost consideration scheduling process 10 may prevent 112 scheduling the calendar event if the calendar event cost projection exceeds the calendar event budged by a predetermined amount (e.g., by any amount, by 10%, etc.).

Continuing with the above-stated example, in which at least one calendar event invitee may have a travel cost associated with the Alpha Project Meeting (e.g., the invitee may have to travel to participate in the meeting), cost consideration scheduling process 10 may analyze 114 a calendar event schedule for the invitee, and may determine 116 whether the event invitee has an existing calendar event scheduled proximate to the Alpha Project Meeting. For example, cost consideration scheduling process 10 may access (e.g., via scheduling server application 20) the schedules of the invitees (e.g., of user 46, user 48, user 50, user 52, and John) of the Alpha Project Meeting, and may analyze 114 the schedules of the invitees and determine 116 if any of the invitees has a calendar event scheduled proximate (e.g., one or more of geographically proximate, and proximate in time) to the proposed calendar event (e.g., the Alpha Project Meeting). The degree of geographic and time-wise proximity may be established via preferences (i.e., which may be set by a system administrator, or the like).

For example, assume that user 52, who may be required to travel from Ireland to Cambridge to attend the Alpha Project Meeting, has another meeting scheduled for Thursday, June 12 (e.g., two days after the proposed calendar event). As such, cost consideration scheduling process 10 may determine that user 52 has another calendar event schedule that is geographically and time-wise proximate to the Alpha Project Meeting. Having determined that user 52 has a scheduled calendar event proximate to the Alpha Project Meeting, cost consideration scheduling process 10 may determine 118 and add-on cost projection associated with scheduling the Alpha Project meeting adjacent to the existing calendar event. If cost consideration scheduling process 10 determines that there is another calendar event that is geographically proximate, but is not time-wise proximate to the proposed calendar event (e.g., the Alpha Project Meeting), cost consideration scheduling process may provide 108 a recommendation to change the time parameter of the proposed calendar event to be proximate to the other, geographically proximate, calendar event.

For example, and continuing with the above-stated example, user 52 may already be incurring travel costs associated with the Thursday, June 12 meeting. As such, the Alpha Project meeting may only require user 52 to arrive two days earlier, and to stay in the Boston area for an extra two days. Therefore, the add-on cost associated with the proposed calendar event may only be two nights lodging. Further, the travel costs of the proposed calendar event and the June 12 meeting may be divided between the two calendar events.

Cost consideration scheduling process 10 may compare 104 the add-on cost projection to at least one of the cost projection (e.g., not taking the add-on cost into consideration) and the calendar event budget, as described above. For example, the add-on cost of user 52 arriving in the Boston area two days earlier than the June 12 meeting (i.e., in time to attend the Alpha Project Meeting) may result in a lower invitee cost (e.g., by eliminating round-trip travel expenses to travel to and from Cambridge for the proposed calendar event). Based upon, at least in part, the add-on cost (e.g., which may be less than round-trip travel costs for the proposed calendar event), cost consideration scheduling process 10 may schedule 120 the Alpha Project Meeting.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
   receiving, via a computing device, a plurality of calendar event parameters of a proposed calendar event from a user, wherein the plurality of calendar event parameters are one or more selected from a group comprising: an identity of each of one or more meeting invitees, locations of each of the one or more meeting invitees, a location of the proposed calendar event, travel required for each of the one or more meeting invitees to attend the proposed calendar event, a proposed time of the proposed calendar event, and whether the proposed calendar event is an in person event or a teleconference event;
   analyzing a calendar event schedule for an invitee of the one or more meeting invitees;
   determining, via the computing device, a cost metric associated with each of the one or more selected plurality of calendar event parameters of the proposed calendar event, wherein the cost metric associated with each of the selected plurality of calendar event parameters includes: an attendance cost per invitee of the one or more meeting invitees including a lost opportunity cost resulting from an unavailability of the invitee of the one or more meeting invitees to perform other tasks, and wherein the attendance cost per invitee of the one or more meeting invitees varies for each invitee of the one or more meeting invitees based upon a ranking in an organizational hierarchy for each invitee of the one or more meeting invitees and an experience level for each invitee of the one or more meeting invitees, and wherein the cost metric associated with each of the selected plurality of calendar event parameters includes applying an objective monetarily defined cost to the one or more of the selected plurality of calendar event parameters and applying a subjective monetarily defined cost to the one or more of the selected plurality of calendar event parameters;
   analyzing the calendar event schedule for the invitee of the one or more meeting invitees based upon a proximity of the calendar event schedule to an existing calendar event, wherein said proximity is selected from a group comprising of at least: a geographic proximity and a proximity in time;
   determining, via the computing device, a calendar event cost projection based upon, at least in part, the cost metric associated with each of the plurality of the calendar event parameters and when the invitee of the one or more meeting invitees has an existing calendar event scheduled proximate to the proposed calendar event, determining an add-on cost projection associated with scheduling the proposed calendar event adjacent to the existing calendar event, wherein a portion of the calendar event cost projection and the add-on cost projection for the invitee of the one or more meeting invitees is divided between the existing calendar event and the proposed calendar event;
   comparing, via the computing device, the calendar event cost projection to a calendar event budget, and in response to the comparing:
   providing, via the computing device, a warning when the calendar event cost projection exceeds the calendar event budget, and
   providing a recommendation to reduce the calendar event cost projection, wherein the recommendation includes implementing one or more options to change at least one of the plurality of calendar event parameters, the one or more options selected from a group comprising: a first option to remove at least one of the one or more meeting invitees, a second option to change the location of the proposed calendar event, and a third option to conduct a teleconference for the proposed calendar event; and
   scheduling, via the computing device, the proposed calendar event based upon, at least in part, implementing the selected one or more options reducing the calendar event cost projection from the user.

2. The method of claim 1, wherein the cost metric comprises at least one of: a travel cost per invitee of the one or more meeting invitees, an event time cost of the proposed calendar event, an event location cost of the proposed calendar event and an event type cost of the proposed calendar event.

3. The method of claim 1, further comprising preventing the scheduling of the proposed calendar event when the calendar event cost projection exceeds the calendar event budget.

4. A computer program product residing on a non-transitory computer readable medium having a plurality of instructions stored thereon which, when executed by a processor, cause the processor to perform operations comprising:
   receiving a plurality of calendar event parameters of a proposed calendar event from a user, wherein the plurality of calendar event parameters are one or more selected from a group comprising: an identity of each of one or more meeting invitees, locations of each of the one or more meeting invitees, a location of the proposed calendar event, travel required for each of the one or more meeting invitees to attend the proposed calendar event, a proposed time of the proposed calendar event, and whether the proposed calendar event is an in person event or a teleconference event;

analyzing a calendar event schedule for an invitee of the one or more meeting invitees;

determining a cost metric associated with each of the one or more selected plurality of calendar event parameters of the proposed calendar event, wherein the cost metric associated with each of the selected plurality of calendar event parameters includes: an attendance cost per invitee of the one or more meeting invitees including a lost opportunity cost resulting from an unavailability of the invitee of the one or more meeting invitees to perform other tasks, and wherein the attendance cost per invitee of the one or more meeting invitees varies for each invitee of the one or more meeting invitees based upon a ranking in an organizational hierarchy for each invitee of the one or more meeting invitees and an experience level for each invitee of the one or more meeting invitees, and wherein the cost metric associated with each of the selected plurality of calendar event parameters includes applying an objective monetarily defined cost to the one or more of the selected plurality of calendar event parameters and applying a subjective monetarily defined cost to the one or more of the selected plurality of calendar event parameters;

analyzing the calendar event schedule for the invitee of the one or more meeting invitees based upon a proximity of the calendar event schedule to an existing calendar event, wherein said proximity is selected from a group comprising of at least: a geographic proximity and a proximity in time;

determining a calendar event cost projection based upon, at least in part, the cost metric associated with each of the plurality of the calendar event parameters and when the invitee of the one or more meeting invitees has an existing calendar event scheduled proximate to the proposed calendar event, determining an add-on cost projection associated with scheduling the proposed calendar event adjacent to the existing calendar event, wherein a portion of the calendar event cost projection and the add-on cost projection for the invitee of the one or more meeting invitees is divided between the existing calendar event and the proposed calendar event;

comparing the calendar event cost projection to a calendar event budget, and in response to the comparing:

providing a warning when the calendar event cost projection exceeds the calendar event budget, and providing a recommendation to reduce the calendar event cost projection, wherein the recommendation includes implementing one or more options to change at least one of the plurality of calendar event parameters, the one or more options selected from a group comprising: a first option to remove at least one of the one or more meeting invitees, a second option to change the location of the proposed calendar event, and a third option to conduct a teleconference for the proposed calendar event; and scheduling the proposed calendar event based upon, at least in part, implementing the selected one or more options reducing the calendar event cost projection from the user.

5. The computer program product of claim 4, wherein the cost metric comprises at least one of: a travel cost per invitee of the one or more meeting invitees, an event time cost of the proposed calendar event, an event location cost of the proposed calendar event and an event type cost of the proposed calendar event.

6. The computer program product of claim 4, further comprising instructions for preventing the scheduling of the proposed calendar event when the calendar event cost projection exceeds the calendar event budget.

7. A computing system comprising:
at least one processor;
at least one memory architecture coupled with the at least one processor;
a first software module executed on the at least one processor and the at least one memory architecture, wherein the first software module is configured to receive a plurality of calendar event parameters of a proposed calendar event from a user, wherein the plurality of calendar event parameters are one or more selected from a group comprising: an identity of each of one or more meeting invitees, locations of each of the one or more meeting invitees, a location of the proposed calendar event, travel required for each of the one or more meeting invitees to attend the proposed calendar event, a proposed time of the proposed calendar event, and whether the proposed calendar event is an in person event or a teleconference event;
a second software module configured to analyze a calendar event schedule for an invitee of the one or more meeting invitees;
a third software module configured to determine a cost metric associated with each of the one or more selected plurality of calendar event parameters of the proposed calendar event, wherein the cost metric associated with each of the selected plurality of calendar event parameters includes: an attendance cost per invitee of the one or more meeting invitees including a lost opportunity cost resulting from an unavailability of the invitee of the one or more meeting invitees to perform other tasks, and wherein the attendance cost per invitee of the one or more meeting invitees varies for each invitee of the one or more meeting invitees based upon a ranking in an organizational hierarchy for each invitee of the one or more meeting invitees and an experience level for each invitee of the one or more meeting invitees, and wherein the cost metric associated with each of the selected plurality of calendar event parameters includes applying an objective monetarily defined cost the to one or more of the selected plurality of calendar event parameters and applying a subjective monetarily defined cost to the one or more of the selected plurality of calendar event parameters;
a fourth software module configured to analyze the calendar event schedule for the invitee of the one or more meeting invitees based upon a proximity of the calendar event schedule to an existing calendar event, wherein said proximity is selected from a group comprising of at least: a geographic proximity and a proximity in time;
a fifth software module configured to determine a calendar event cost projection based upon, at least in part, the cost metric associated with each of the plurality of the calendar event parameters and when the invitee of the one or more meeting invitees has an existing calendar event scheduled proximate to the proposed calendar event, determine an add-on cost projection associated with scheduling the proposed calendar event adjacent to the existing calendar event, wherein a portion of the calendar event cost projection and the add-on cost projection for the invitee of the one or more meeting invitees is divided between the existing calendar event and the proposed calendar event;

a sixth software module configured to compare the calendar event cost projection to a calendar event budget, and in response to the comparing:
a seventh software module configured to provide a warning when the calendar event cost projection exceeds the calendar event budget, and
a eighth software module configured to provide a recommendation to reduce the calendar event cost projection, wherein the recommendation includes implementing one or more options to change at least one of the plurality of calendar event parameters, the one or more options selected from a group comprising: a first option to remove at least one of the one or more meeting invitees, a second option to change the location of the proposed calendar event, and a third option to conduct a teleconference for the proposed calendar event; and
a ninth software module configured to schedule the proposed calendar event based upon, at least in part, implementing the selected one or more options reducing the calendar event cost projection from the user.

8. The computing system of claim 7, wherein the cost metric comprises at least one of a travel cost per invitee of the one or more meeting invitees, an event time cost of the proposed calendar event, an event location cost of the proposed calendar event and an event type cost of the proposed calendar event.

9. The method of claim 1, further comprising:
receiving, from the user, the selection of the one or more options to reduce the calendar event cost projection.

10. The computer program product of claim 4, further comprising instructions for:
receiving, from the user, the selection of the one or more options to reduce the calendar event cost projection.

11. The computing system of claim 7, further comprising:
a ninth software module configured to receive, from the user, the selection of the one or more options to reduce the calendar event cost projection.

* * * * *